United States Patent [19]

Cavy et al.

[11] 4,437,012

[45] Mar. 13, 1984

[54] DEVICE FOR BRINGING ABOUT COINCIDENCE BETWEEN THE AXIS OF A MEASURING PROBE AND A NORMAL TO THE SURFACE OF A PART TO BE CONTROLLED

[75] Inventors: Claude Cavy, Versailles; Marie L. Rolland, Bourg la Reine, both of France

[73] Assignee: Commissariat a l'Energie Atomique, Paris, France

[21] Appl. No.: 328,920

[22] Filed: Dec. 9, 1981

[30] Foreign Application Priority Data

Dec. 24, 1980 [FR] France .................... 80 27514

[51] Int. Cl.³ .................... G12B 5/00; G12B 9/08; G01D 11/00; G01N 23/203
[52] U.S. Cl. .................... 250/491.1; 250/308; 248/662
[58] Field of Search .................... 250/491.1, 308; 73/37.9; 248/662; 108/95, 96

[56] References Cited

U.S. PATENT DOCUMENTS

| | | | |
|---|---|---|---|
| 1,117,917 | 11/1914 | Schoenky | 248/662 X |
| 3,099,934 | 8/1963 | Park | 248/662 X |
| 3,417,949 | 12/1968 | Waber | 248/662 X |
| 3,483,375 | 12/1969 | Joffe et al. | 250/491.1 X |
| 3,714,436 | 1/1973 | Fischer | 250/308 X |

FOREIGN PATENT DOCUMENTS 1001951 12/1976 Canada .
2070925 9/1971 France .
1308135 2/1973 United Kingdom .

OTHER PUBLICATIONS

*Freeland Model L Air Comparator Gages,* Freeland Gauge Company, Jan. 31, 1958.

*Primary Examiner*—Alfred E. Smith
*Assistant Examiner*—Jack I. Berman
*Attorney, Agent, or Firm*—James E. Nilles

[57] ABSTRACT

Device for bringing about the coincidence between the axis of a measuring probe and a normal to the surface of a part to be controlled and application to the measurement of thicknesses of thin layers.

Thus, device (5) forms part of probe (4) on a measuring apparatus comprising means for positioning part (3) and which is constituted by at least one probe translating member (25) making it possible to vary its distance from the part, sensing means (53) integral with the probe for controlling the achievement of coincidence, means (43) for rotating about the axis Y'Y making it possible to give probe axis (A) a direction close to that of normal (N) and means for oscillating probe axis (A) about the said direction in order to achieve the coincidence.

7 Claims, 7 Drawing Figures

DEVICE FOR BRINGING ABOUT COINCIDENCE BETWEEN THE AXIS OF A MEASURING PROBE AND A NORMAL TO THE SURFACE OF A PART TO BE CONTROLLED

BACKGROUND OF THE INVENTION

The present invention relates to a device for bringing about coincidence between the axis of a measuring probe or head and the normal to the surface of a part to be controlled. It is more particularly applicable to measurements of thicknesses of thin layers or to the determination of scatter profiles by back-scattering of electrons.

The aforementioned thin layers can in particular be of metal and are, for example, deposited on a substrate formed from metallic or non-metallic materials. For example, it may be desired to measure the thickness of a thin copper layer deposited on a resin. The thickness of the thin layer or layers deposited on the substrate may obviously be variable, i.e. non-uniform.

Moreover, the surface of the part to be controlled may have different shapes. It may be a surface having at least one axis of revolution, such as a spherical surface. The present invention is more particularly applicable to measuring the thickness of thin layers deposited on the surface of a hemispherical member or a body of revolution, such as a member shaped like a semi-ellipsoid of revolution.

For example, apparatuses for measuring the thickness of thin layers by electron back-scattering or $\beta$ back-scattering are known, which comprise a measuring probe or measuring head able to emit electrons onto a part comprising one or more thin layers deposited on a substrate. The electrons which are back-scattered by these thin layers are then detected by detection means placed in the probe and making it possible to calculate a "counting rate" corresponding to the number of back-scattered electrons detected per unit of time. This counting rate is characteristic of the thickness of the layers, the chemical nature of the layers and the energy of the electrons used, and since the two latter factors are known, the counting rate can be used for measurements of layer thicknesses that vary between a few microns to several hundred microns.

It is known that the two main sources of errors when measuring thin layer thicknesses by $\beta$ back-scattering are a lack of perpendicularity of the probe relative to the part to be controlled that carries the layer or layers under investigation and the distance between the probe and the part to be controlled.

It has been found that the error in the thickness measurement of a layer increases rapidly with the lack of perpendicularity or the "angular separation" between probe and part. Moreover, the sensitivity of the measuring apparatus decreases as the distance between the probe and the part increases. The resulting errors are explained by the lack of detection of all the back-scattered electrons from the analysed area of the part to be controlled.

BRIEF SUMMARY OF THE INVENTION

The object of the present invention is to reduce the aforementioned sources of error and more particularly the first-mentioned error source within the scope of the more general objective of bringing about coincidence between the axis of a measuring probe and a normal to the surface of a part to be controlled.

According to the invention, this object is achieved by a device for bringing about coincidence between the axis of a measuring probe and a normal to the surface of a part to be controlled, said device as well as said probe, forming part of a measuring apparatus which also comprises means for supporting and positioning the part and means for supporting the probe, said apparatus comprising at least one member for the translation of the probe making it possible to vary its distance from the part, sensing means integral with the probe for controlling the bringing about of coincidence, rotation means making it possible to give the probe axis a direction close to that of the normal and means for oscillating the probe axis about this direction in order to complete the bringing about of coincidence.

The term axis of a measuring probe is understood to mean the direction in which the measurement is performed. Thus, in the case of measurements of thicknesses of thin layers by $\beta$ back-scattering, this expression designates the preferred direction of emission of electrons by the probe (also the preferred direction of the back-scattering of the electrons).

Thus, the present invention has the advantage of permitting a better positioning of the probe relative to the part to be controlled, particularly in the case of measurements of thicknesses of thin layers by $\beta$ back-scattering in which it is desired to recover the maximum number of electrons back-scattered by the studied area of the thin layer or layers.

The present invention also has the advantage of making it possible to bring about this coincidence without there being any contact between the part to be controlled and the measuring probe. After coincidence is achieved, it is possible as a result of the probe translation member to bring about contact between the probe and the part. In the case of measurements of thicknesses of thin layers by $\beta$ back-scattering, the back-scattered electrons are better recovered by the probe for being detected.

The present invention is particularly useful in the case of parts having an axis of revolution because, for example, in the case of measurements of the thicknesses of thin layers by $\beta$ back-scattering, the prior art apparatus for performing such measurements are not generally suitable for use on such parts.

According to a special feature of the device according to the invention, it also comprises other translation members for adjustably shifting the probe in two orthogonal directions in order to bring about the said coincidence.

Preferably, the sensing means comprise at least three calibrated nozzles fixed to the probe and able to supply in each case a jet of fluid from a pressurized source thereof to the said surface in the vicinity of the normal, the bringing about of coincidence being controlled by comparing the pressures of the fluid leaving the nozzles, these pressures being equal when the coincidence is achieved.

According to another special feature of the invention, as the end of the probe and the part are able to conduct electricity, electrical means connected to the end of the probe and to the part are provided for checking contact between them.

According to a special embodiment of the device according to the invention, the means for supporting and positioning the part comprise part supporting means rotatable about a reference axis and adjustably shiftable along that axis and holding means for steadying the part on said part supporting means with an axis of revolution of the part coinciding with that reference axis, said part supporting means and said holding means being connected with the device that adjustably supports the probe.

Moreover, the probe supporting means may comprise a beam carrying the device according to the invention, which itself carries the probe.

According to a special feature, the device according to the invention is applicable to the measurement of thicknesses of thin layers on a part by electron back-scattering, and wherein the probe may comprise an electron emission source, a collimator provided with an aperture via which the electrons are transmitted to the thin layer, and means for detecting electrons back-scattered by the thin layer and thus supplying data which, processed by electronic means, make it possible to determine the thickness of the layer.

The electron source may be fixed to the collimator by welding. It is preferably connected to the end of a rod fixed to a strip, which is welded within the collimator.

The collimator can be made from an alloy based on elements with atomic members equal to or below that of aluminium in order to decrease the background noise in the detection means. Finally, said detection means may comprise Geiger-Muller counter.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

Figure 1:
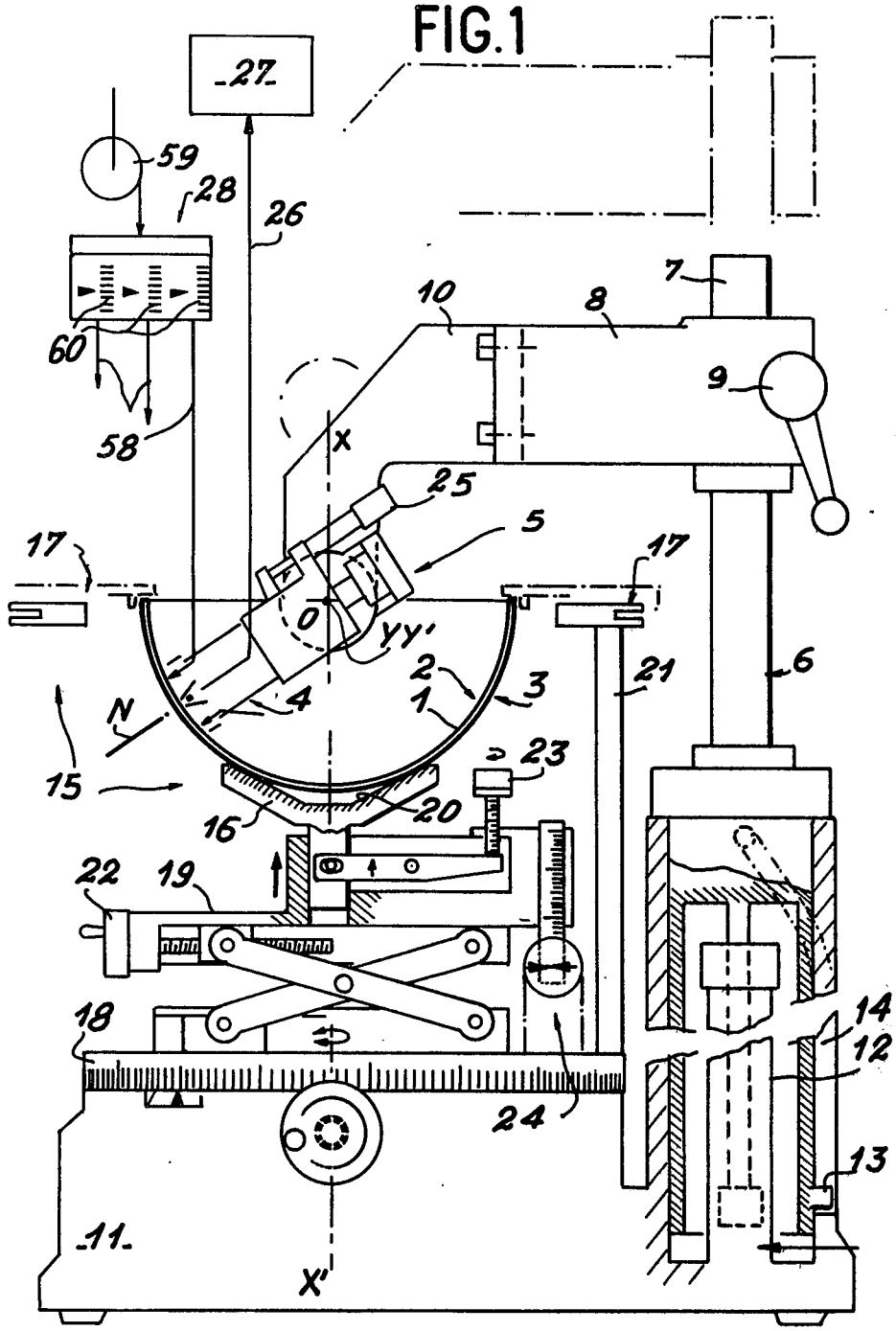
FIG. 1 is a diagrammatic view of an embodiment of an apparatus for measuring thicknesses of thin layers by $\beta$ back-scattering, said apparatus comprising a device according to the invention and the layer to be analysed having a hemispherical concave surface.

FIG. 1 diagrammatically shows a special embodiment of an apparatus for measuring the thicknesses of thin layers by $\beta$ back-scattering.

A thin layer 1 which is able to conduct electricity (e.g. a metal layer), whose thickness (which is not necessarily uniform) is to be determined, is deposited on the inner surface 2 of a hemispherical hollow part 3 to be controlled, which thus serves as the substrate for layer 1. The measurement can be performed by a probe 4, whose construction will be explained in connection with the description of FIG. 4. It is fixed to a device 5 according to the invention shown in more detailed manner in FIG. 4, and the device 5 is in turn carried by a beam 6 that constitutes the supporting means of probe 4.

The device according to the invention (as will be shown in connection with the description of FIG. 4) makes it possible to bring about coincidence between axis A (FIG. 4) of probe 4 and a normal N to the surface of layer 1, which has become the inner face 2 of hollow part 3.

Beam 6 comprises a vertical column 7 and a horizontal support arm 8 that is adjustable up and down along column 7 and can be locked in any position along it by locking means 9. A member 10 bent downwards at right angles and carrying device 5 according to the invention is fixed by a dovetail to support arm 8, as can be better seen in FIG. 3, and constitutes an extension of said arm 8. Beam 6 is carried by a base block 11. Moreover, support arm 8 can be automatically collapsed at the high point of beam 6 by compressed air pressure by means of a jack 12 and a lug 13 displaceable in a hollow disengagement ramp 14 making it possible to "tilt" probe 5 and fit hollow part 3.

The supporting and positioning means 15 for hollow part 3 comprise supporting member 16 having, for example, the shape of a cone of revolution and holding means 17, whose nature and operation will be explained in connection with the description of FIG. 2.

A horizontal rotary plate 18 is carried by base block 11 and itself carries an elevating or lifting table 19 to which is fixed supporting member 16. The latter is hollow and is arranged so as to have a vertical axis of revolution and an upwardly concave inner face 20.

The holding means 17 are fixed to the rotary plate 18 by at least one and for example three vertical legs 21. Supporting member 16 and rotary plate 18 are mounted in such a way that the axis of revolution of bearing member 16 and the rotation axis of rotary plate 18 coincide in the same axis X'X, which can be considered a reference axis.

Device 5 according to the invention, mounted on the bent member 10, permits probe 4 to describe vertical circular arcs that are all concentric to a horizontal axis Y'Y (perpendicular to the plane of FIG. 1) which intersects the reference axis X'X at 0 (0 is the line of axis Y'Y in the plane of FIG. 1).

With part 3 placed with its inner face 2 upwards on supporting member 16, first and second regulating means 22, 23 make it possible for the elevating table 19 and consequently part 3 to move upwards along reference axis X'X until part 3 is fitted, its centre then tending to coincide with point 0, that point being at the centre of the holding means 17 which exert forces on the part such that, once fitted, its axis of revolution coincides with axis X'X.

The first regulating means 22 enables part 3 to effect a close approach, which can be checked by optical reading means 24. The second regulating means 23 permit a final positioning of part 3 by friction.

A translation member such as a micrometer screw 25, which forms part of device 5 according to the invention, makes it possible to move probe 4 against part 3. Probe 4 makes it possible to firstly determine the thickness of layer 1 at all the points thereof located on the same meridian or on the same parallel thereof, said points being attainable by rotation of the rotary plate 18 and/or by rotation of probe 5 about axis Y'Y.

A shielded cable 26 connects probe 4 to electronic means 27, whose function will be explained hereinafter in connection with FIG. 4. Finally, means 28 for controlling coincidence are provided and will be described in connection with FIG. 4.

Figure 2:
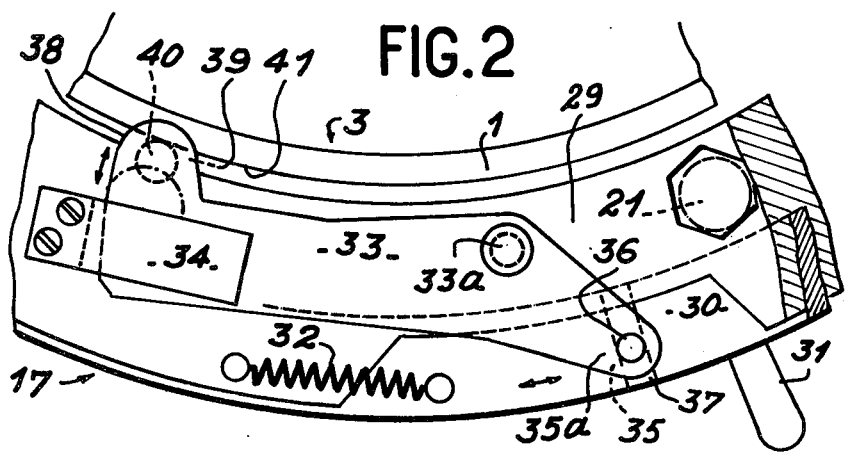
FIG. 2 is a diagrammatic plan view of a portion of a special embodiment of the holding means for the part shown in FIG. 1.

FIG. 2 is a diagrammatic plan view of part of the special embodiment of the holding means 17 of part 3 referred to hereinbefore.

These holding means 17 comprise a ring 29, called a support ring, fixed to three vertical legs 21 on rotary plate 18. The internal diameter of support ring 29 is greater than the external diameter of part 3 to be controlled, so that once the latter has been fitted it is surrounded by support ring 29. A control ring 30, provided with at least one handle 31, is concentric to support ring 29 and rotates about the latter. Elastic return means 32 connect the two rings 29 and 30. Three arms 33 (only one being visible in FIG. 2) are arranged in the form of an equilateral triangle on support ring 29 and are articulated thereto on axes 33a. Plates 34, fixed to the support ring 29, confine each arm 33 against the top surface of the support ring 29. A radially outwardly projecting part of a first free end 35a of each arm 33 carries a pin 36 that is movable in a guidance ramp 37 in control ring 30. The other free end 38 of each arm 33 "projects" radially inwardly beyond support ring 29 and carries a vertical finger 40 in the lower part 39 thereof.

In the normal position of the arms 33 their radially inwardly projecting ends 38 prevent the fitting onto the supporting member 16 of a part 3 to be controlled. However, as a result of the displacement of handle 31, fingers 40 are moved radially outwardly and part 3 can be fitted. By releasing handle 31, fingers 40 reassume their initial position and lock part 3, whose upper edge 41 abuts on the one hand against fingers 40 and on the other against the lower part 39 of each second free end 38 of arms 33. Part 3 is then held in position in the holding means 17 and has a vertical axis of revolution (FIG. 1).

Obviously, the holding means 17 described hereinbefore make it possible in general to fit any part, whose surface permits an axis of revolution, the position of fingers 40 being adapted in accordance with known rules to the shape of the part in order to hold the latter.

Figure 3:
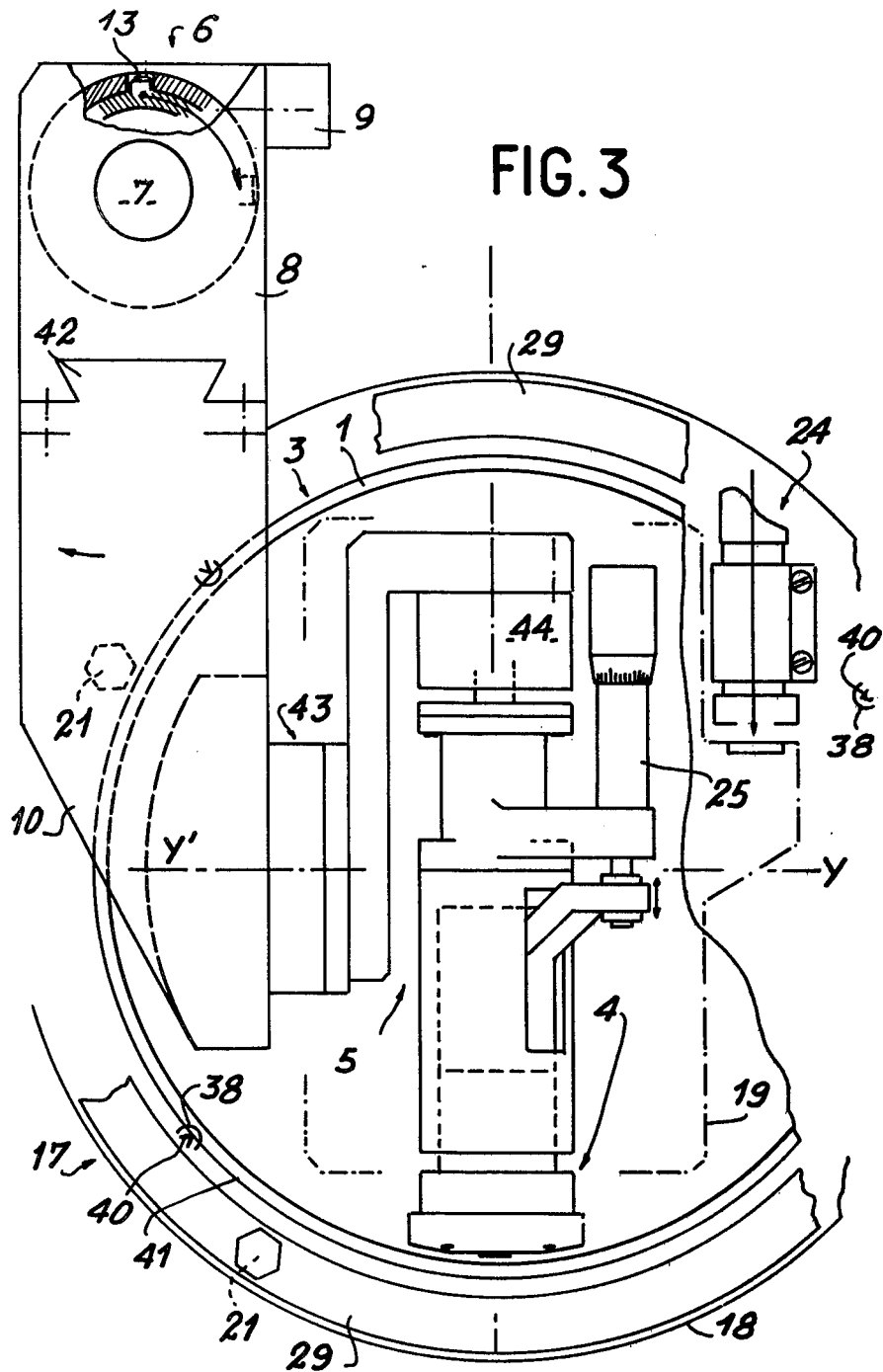
FIG. 3 is a diagrammatic plan view of the measuring apparatus of FIG. 1.

FIG. 3 is a diagrammatic plan view of the measuring apparatus of FIG. 1. Part 3 on which is deposited layer 1, whose thickness is to be measured, is fitted, in particular by means of holding means 17.

Device 5 according to the invention is fixed to the bent member 10, which is itself fixed to the support arm 8 of beam 6 by a quick-acting dovetail assembly 42. Device 5 (which will be described in greater detail in connection with FIG. 4) comprises rotation means 43, oscillation means 44 and at least one translation member 25, to which is fixed probe 4. The quick-action dovetail assembly 42 makes it possible to change the measuring probe 4 as a function of the dimensions of parts 3 to be controlled (i.e. the diameter of the largest cross-section perpendicular to the axis of revolution of parts having such an axis).

Figure 4:
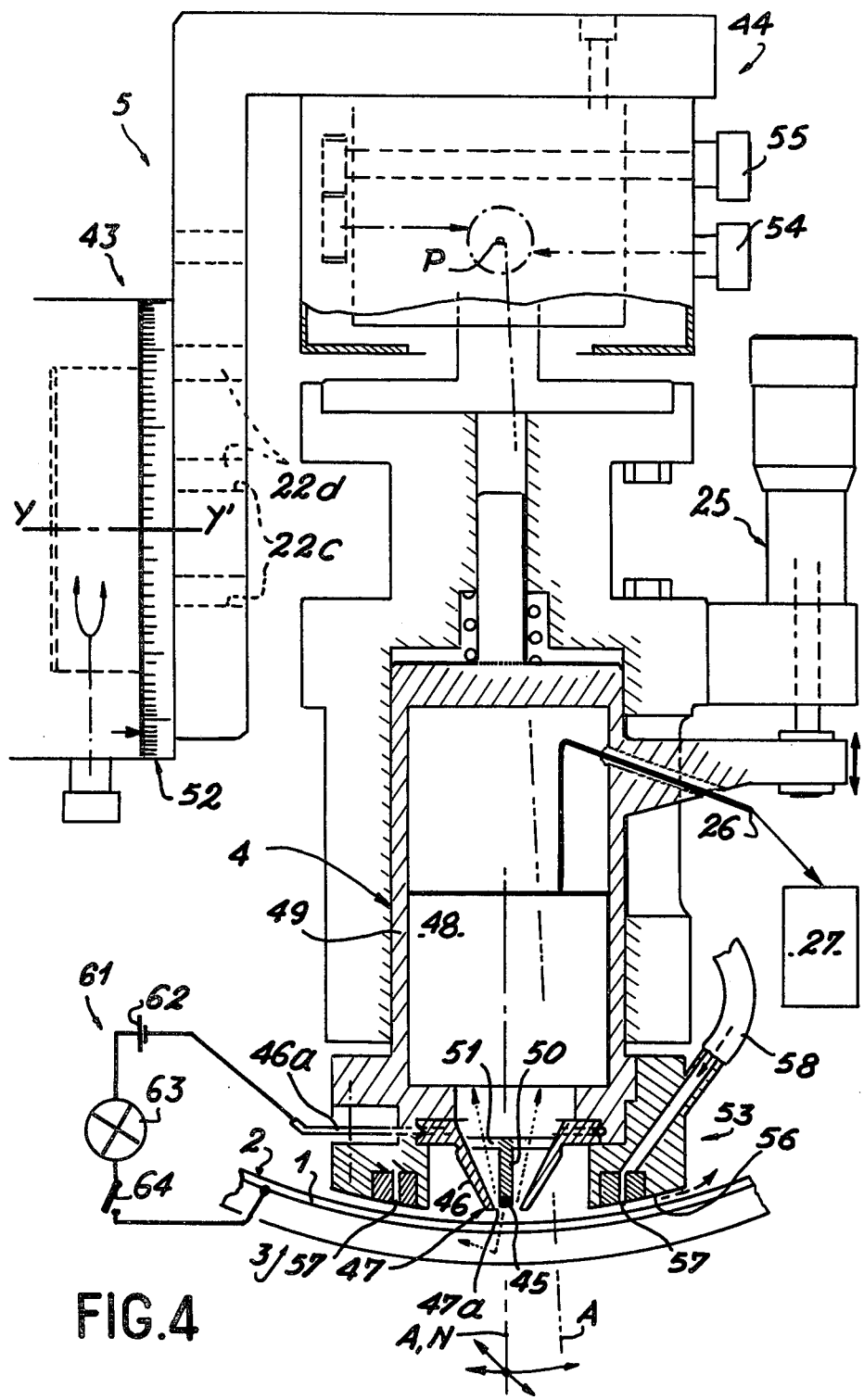
FIG. 4 is a diagrammatic view of the probe used in the apparatus of FIG. 1 and a device according to the invention to which said probe is joined.

FIG. 4 diagrammatically shows probe 4 of FIG. 1, as well as a device 5 according to the invention to which is fixed probe 4.

Measuring probe 4 comprises an electron emission source 45, a collimator 46 provided at its end 47 (also constituting the end of probe 4) with an aperture 47a by which the electrons are transmitted to the thin layer 1 and by which the electrons back-scattered by the layer 1 are partly recovered and means 48 for detecting these back-scattered and recovered electrons, supplying data which are a function of the thickness of layer 1.

Per se known electronic means are connected by a shielded cable 26 to detection means 48 and process the data in order to convert them into a counting rate characteristic of the thickness of layer 1 for a given material forming the latter.

Aperture 47a with which collimator 46 is provided defines the analysed area of thin layer 1. Collimator 46 is made from a material able to reduce the background noise in detection means 48. This material can be an alloy based on light elements such as aluminium. The detection means comprise, for example, a Geiger-Muller counter. Collimator 46 is held on an e.g. cylindrical probe body 49 containing detection means 48 by a metal holding pin 46a.

Electron source 45 is connected to the end of a rod 50 fixed to a strip 51, which is welded within collimator 46. Obviously, strip 51 could be fixed to collimator 46 by other means equivalent to welding, but welding strips 51 within collimator 46 leads to reduced overall dimensions, rapid and simple fitting of collimator 46 and good reproducibility of the measurements performed.

The electron source 45 may be constituted by radioactive elements such as promethium 147, thallium 204, strontium 90 or ruthenium 106, all of which only emit electrons by decay. The depth by which these electrons penetrate the material is dependent on their energy and consequently the radioactive emitters used. For example, in a material such as gold, and in the case of the elements $^{147}$Pm, $^{204}$Tl and $^{90}$Sr emitting electrons whose maximum energies are respectively 220, 760 and 2284 keV, the corresponding penetration depths are respectively equal to 7, 29 and 100 $\mu$m. On the basis of this example, it is apparent that the analysed material thickness is a rising function of the energy of the electrons.

Moreover, to determine thicknesses, it is necessary to perform a prior calibration of probe 4, e.g. with flat metal sheets having a calibrated thickness.

As has been stated hereinbefore, it is possible to define an axis A for probe 4 and the measurement is performed along this axis. In the present case, it is the preferred direction of electron emission by the probe (also the preferred electron back-scattering direction). For example, in the case of a collimator 46 shaped like a cone of revolution and with the rod 50 to the end of which is joined electron source 45 disposed in accordance with the axis of the cone of revolution, said axis constitutes axis A of the probe.

The device 5 according to the invention makes it possible to correctly position probe 5 relative to layer 1, whose thickness is to be measured at different points. More specifically, device 5 makes it possible to make axis A of probe 4 coincide with a normal N to surface 2 of layer 1. Device 5 according to the invention comprises means 43 for swinging the probe about axis Y'Y, means for oscillating the axis A of probe 4, at least one member 25 for the translation of probe 4 and sensing means 53 fixed to probe 4 for controlling the bringing about of coincidence.

The rotation means 43 make it possible to rotate probe 4 in order to give axis A thereof a direction close to that of normal N. They are fixed to beam 6 (FIGS. 1 and 3) by means of the bent member 10 (FIGS. 1 and 3)

and comprise marking means 52 (FIG. 4) making it possible to know the angle by which probe 4 has been rotated for positioning the same.

The per se known oscillation means 44 fixed to rotation means 43 make it possible to displace axis A of probe 4 about the direction close to that of normal N in order to achieve the said coincidence. To this end, they comprise two controls 54 and 55 permitting a spatial rotation (e.g. of 2°) of axis A of probe 4 about a point P belonging to axis A and to oscillation means 44.

The translation means 25 comprises, for example, a micrometer screw integral with the oscillation means 44 and permitting a translation of probe 4 along axis A thereof.

Figure 5B:
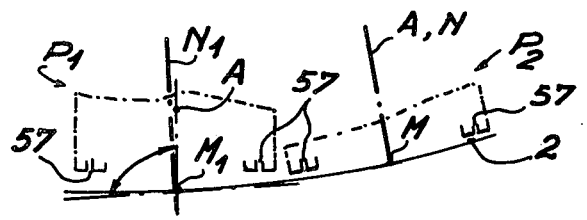
FIGS. 5a and 5b diagrammatically illustrate the bringing about of coincidence between the axis of the probe of FIG. 1 and a normal to the surface of the layer to be analysed.
Figure 5A:
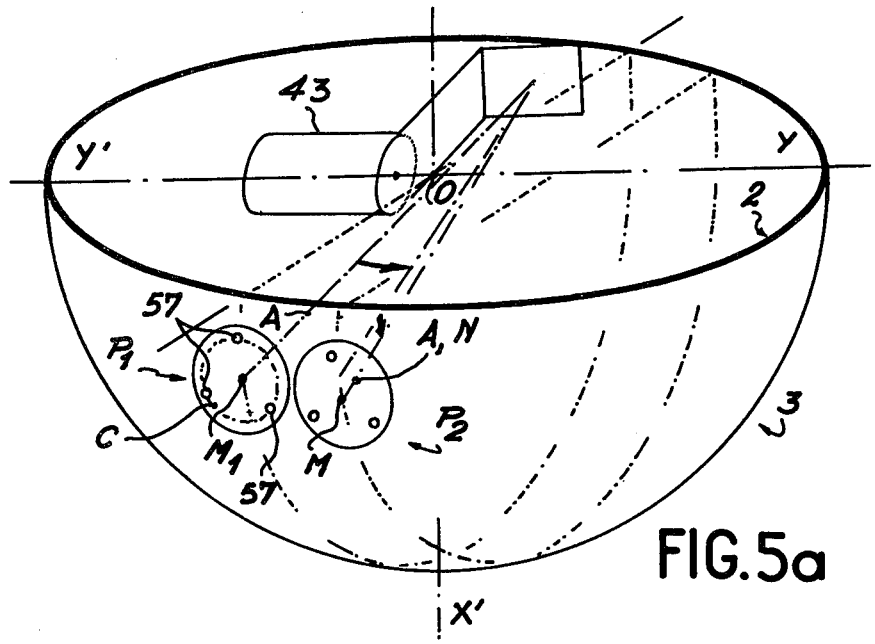

The sensing means 53 comprise a ring-shaped member 56 surrounding collimator 46 and fixed to probe 4 and in which there are three calibrated nozzles 57, each in radially outwardly spaced relation to aperture 47a of collimator 46, arranged in the form of an equilateral triangle on a circle C (FIG. 5a), whose plane is perpendicular to axis A of probe 4 and which is centered on said axis. Each of these nozzles 57 is connected by a pipe 58 to a compressor 59 (FIG. 1) for supplying a fluid, such as nitrogen, under a given pressure (e.g. 3 bars) to nozzles 57. Pressure control means 28 (FIG. 1), such as three per se known electronic comparators provided with linear pressure reading scales 60 (FIG. 1) make it possible to compare the pressures of the fluid on leaving nozzles 57.

With the part 3 to be controlled fitted in the manner described in connection with FIGS. 1 and 2, probe 4 is rotated about axis Y'Y by rotation means 43 and, if necessary, rotary plate 18 (FIG. 1) is also rotated to give axis A of probe 4 a direction close to the normal N to surface 2 of layer 1. In other words, probe 4 is positioned in such a way that electron source 45 faces a point M1 of surface 2 (position P1 in FIGS. 5a and 5b) at which the thickness of layer 1 is to be measured. Micrometer screw 25 is manipulated so as to bring the probe approximately 200 to 300 $\mu$m from surface 2. Probe axis A intersects surface 2 at said point M1 and does not generally coincide with normal N1 at this point on surface 2. Each of the three nozzles 57 supplies a jet of the aforementioned fluid to surface 2 and the pressures indicated on the three linear scales 60 consequently generally differ, because the nozzles 57 are then at different distances from surface 2 (position P1 in FIG. 5b).

Oscillation means 44 are then operated by controls 54 and 55 in order to oscillate axis A of probe 4 about point P until the pressures indicated on the three linear scales 60 are identical. Thus, the pressures of the fluid on leaving nozzles 57 are to be the same, which means that the nozzles 57 are equidistant from surface 2 of layer 1 (position P2 of FIG. 5b). Thus, the desired coincidence is obtained and axis A of probe 4 coincides with the normal N at a point M of surface 2, said point M being close to the initial point M1 (position P2 in FIGS. 5a and 5b).

The supply of the fluid is then interrupted and probe 4 (FIG. 4) is moved towards layer 1 by means of micrometer screw 25 until end 47 of probe 4 is in contact with surface 2 of layer 1. Electrical means 61 comprising, for example, a current generator 62, a lamp 63 and a switch 64 arranged in series electrically connect the electricity-conducting thin layer 1 to metal pin 46a maintaining collimator 46 made, e.g. from aluminium, on body 49 of the probe. Thus, lamp 63 lights up as soon as there is contact between end 47 of probe 4 and thin layer 1, which makes it possible to check that contact has taken place without damaging or destroying layer 1. Obviously, for said check to take place, it is merely necessary for the end 47 of probe 4 to conduct electricity and to be electrically connected to layer 1 by electrical means 61. When layer 1 does not conduct electricity, it is still possible to bring about contact (electrical means 61 being unnecessary), but there is a danger of damaging layer 1.

Figure 6:
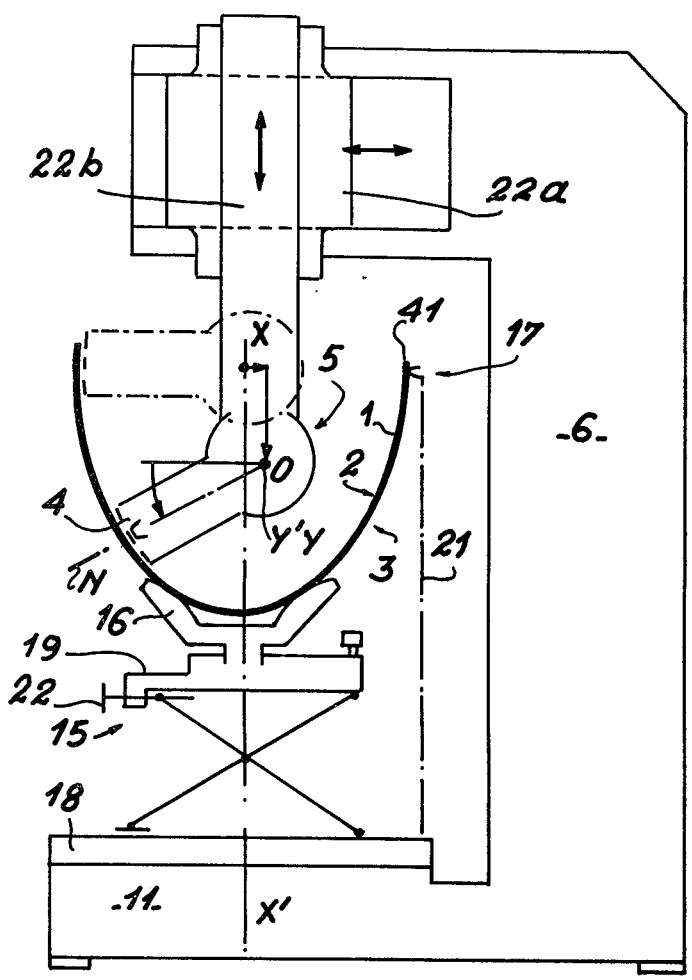
FIG. 6 is a diagrammatic view of a special embodiment of an apparatus for measuring thicknesses of thin layers by $\beta$ back-scattering, said apparatus comprising a device according to the invention and the layer to be analysed having a concave surface having an axis of revolution.

FIG. 6 diagrammatically shows an embodiment of an apparatus for measuring the thickness of thin layers by $\beta$ back-scattering, which only differs slightly from that of FIG. 1. It makes it possible to measure thicknesses of thin layers deposited on parts not necessarily having a spherical shape, but in more general terms having an axis of revolution, such as hollow part 3, which has an axis of revolution and on the inner face 2 of which is deposited a thin electricity-conducting layer 1. Edge 41 of part 3 assumes the shape of a circle contained in a plane perpendicular to the axis of revolution of part 3.

Under these conditions, the supporting and positioning means 15 for hollow part 3 can be identical to those described hereinbefore for the measuring apparatus of FIG. 1. When the hollow part 3 is fitted and with its inner face 2 turned upwards, the axis of rotary plate 18, the axis of revolution of bearing means 16 and the axis of revolution of hollow part 3 coincide in the same axis X'X.

Device 5 for bringing about coincidence in accordance with the present invention and incorporated in the measuring apparatus of FIG. 6, comprises the same means as those described in connection with FIG. 4, namely rotation means 43, oscillation means 44, sensing means 53 integral with probe 4 for controlling the bringing about of coincidence and member 25 for the translation of probe 4 (FIG. 4). Electrical means 61 (FIG. 4) are also used for checking that contact has taken place between probe 4 and thin layer 1.

Although a device 5 as described hereinbefore is adequate for controlling a thin layer 1 deposited on a spherical hollow part 3 (FIG. 1) and therefore of constant curvature, it is not adequate for controlling a part with a varying curvature, which is generally the case with bodies of revolution like the hollow part 3 of FIG. 6. In other words, such a device is no longer adequate for bringing about coincidence between axis A (FIG. 4) of probe 4 and a normal N to the surface of a non-spherical part, but which still has an axis of revolution.

In order to bring about coincidence in such a case, it is merely necessary to modify the device 5 according to the invention of FIG. 1 by adding to it other per se known horizontal and vertical translation members 22a and 22b respectively (FIG. 6) and which make it possible, by cooperating with rotation means 43, oscillation means 44, sensing means 53 and translation member 25 of (FIG. 4), to displace the centre 0 of rotation of probe 4 in order to bring the latter into the vicinity of the studied point of thin layer 1 and orient said probe in accordance with the normal at said point to surface 2 of layer 1 or more specifically, and as has been stated hereinbefore, bring about coincidence between axis A (FIG. 4) of the probe and the normal N at a point positioned in the vicinity thereof.

The two translation members 22a and 22b, are, for example, rendered integral with the bent member 10 (FIG. 1), translation member 22b then carrying rotation means 43 (FIG. 4). Obviously, they could also be placed elsewhere.

Obviously, the measuring apparatus shown in FIG. 6 makes it possible to control not only bodies of revolution (concave, convex or more generally curved), but also bodies which are not strictly of revolution and which have irregularities of curvature such as planar parts or "expanded" parts.

Figure 7:
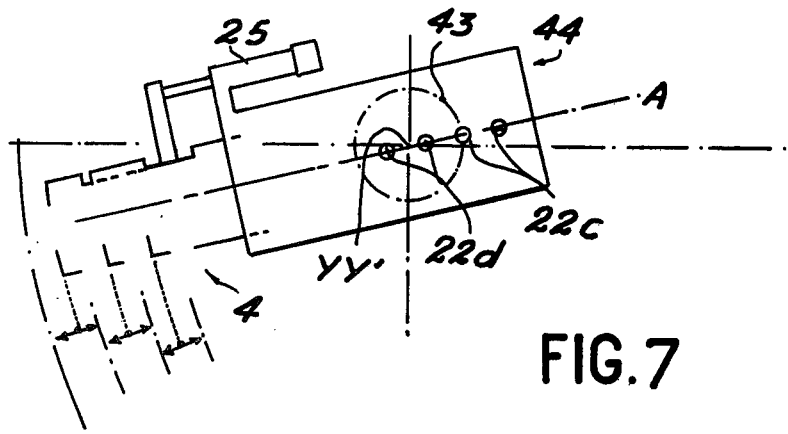
FIG. 7 is a diagrammatic view of an embodiment of the device according to the invention comprising means for stepwise adjusting the distance between the probe and the layer.

For the positioning of the measuring probe it may be necessary to move it towards or away from the part to be controlled within the limits permitted by the displacement range of the micrometer screw 25 (FIG. 7) whose capacity is limited. It is then possible to add to the device according to the invention shown in FIGS. 1 and 6 means permitting a stepwise translation of probe 4 in the same direction as that obtained with micrometer screw 25. To this end, the oscillation means 44 are, for example, provided with a plurality of holes 22d (FIGS. 4 and 7) making it possible to fit the oscillation means 44 onto pins 22 integral with the rotation means 43, holes 22c and pins 22d being provided to enable said stepwise translation to take place without losing the direction aimed at by the probe when bringing about the said coincidence.

The device according to the invention makes it possible to bring about a correct positioning of the probe on the part to be controlled, particularly when the latter has a curvature differing at different points on its surface. The device can be automated in per se known manner, particularly for permitting very accurate, nondestructive control measurements of parts which have to be manufactured under the strictest conditions.

What is claimed is:

1. Apparatus comprising a probe for measuring local thickness of a surface layer that defines a surface of revolution on a part, said probe having a probe axis that must be normal to said surface at each location where a thickness measurement is made and having a front end that must be adjacent to said surface, said apparatus comprising:
   A. supporting means for holding said part with the axis of revolution of its said surface coinciding with a reference axis;
   B. a first carrier member connected with said supporting means and adjustably shiftable relative thereto in opposite directions parallel to said reference axis;
   C. a second carrier member connected with said first carrier member for bodily movement therewith in said opposite directions and for rotation relative thereto about a rotation axis transverse to said reference axis;
   D. a third carrier member connected with said second carrier member for bodily movement therewith and for limited swinging relative thereto about an oscillation axis substantially transverse to said reference axis and said rotation axis;
   E. a connection between said probe and said third carrier member whereby
      (1) the probe is disposed with its probe axis substantially intersecting and normal to said rotation axis and said oscillation axis and its front end remote from those axes,
      (2) the probe is constrained to move bodily with said third carrier member, and
      (3) the probe is adjustably shiftable relative to said third carrier member in directions along said probe axis; and
   F. sensing means on the front end portion of the probe, at a plurality of locations spaced from the probe axis, for indicating coincidence between the probe axis and a normal to a local area of surface forwardly adjacent to the probe.

2. The apparatus of claim 1 wherein said supporting means is rotatable about said reference axis.

3. The apparatus of claim 1, further characterized by: said supporting means comprising
   (1) turntable rotatable about said reference axis,
   (2) a supporting member carried by said turntable and upon which a bottom portion of a part can rest, and
   (3) holding means connected with said turntable at locations thereon that are spaced from said reference axis and engageable with an upper portion of a part to hold the part on said supporting member.

4. The apparatus of claim 3 wherein said supporting means further comprises:
   means connecting said supporting member with the turntable for shifting adjustment of the supporting member relative to the turntable in opposite directions along the reference axis.

5. The apparatus of claim 1, further characterized by: said sensing means comprising
   (1) a plurality of forwardly opening nozzles on the front end portion of the probe, spaced at equal distances from the probe axis and connectable with a source of fluid under pressure, to direct jets of the fluid against a surface forwardly adjacent to the probe, and
   (2) means connected with each nozzle to provide an indication of fluid pressure at the nozzle so that orientation of the probe axis normal to said surface is indicated by equal pressures at the several nozzles.

6. The apparatus of claim 1, further characterized by: said probe consisting
   (1) a substantially coaxial electron source at the front end of the probe, and
   (2) a collimator concentrically surrounding said electron source and spaced radially inwardly from said sensing means.

7. The apparatus of claim 6 wherein said collimator projects forwardly on the probe beyond said electron source and said sensing means and is made of electrically conducting material, further characterized by:
   conductor means for connecting said collimator and a surface layer to be measured, in series, with
      (1) an electric current source and
      (2) an electrically energizable device which produces a perceptible signal when energized,
   for indicating the attainment of contact between the collimator and said surface layer.

* * * * *